(12) United States Patent
Rosati et al.

(10) Patent No.: US 9,697,298 B2
(45) Date of Patent: Jul. 4, 2017

(54) ID TAG AUTHENTICATION SYSTEM AND METHOD

(71) Applicant: TrustPoint Innovation Technologies, Ltd., Campbellville (CA)

(72) Inventors: Anthony Rosati, Ottawa (CA); Jason Smith, Waterloo (CA)

(73) Assignee: ETAS Embedded Systems Canada Inc., Waterloo (CA)

( * ) Notice: Subject to any disclaimer, the term of this patent is extended or adjusted under 35 U.S.C. 154(b) by 0 days.

(21) Appl. No.: 14/813,387

(22) Filed: Jul. 30, 2015

(65) Prior Publication Data
US 2016/0042032 A1    Feb. 11, 2016

Related U.S. Application Data

(60) Provisional application No. 62/164,148, filed on May 20, 2015, provisional application No. 62/034,397, filed on Aug. 7, 2014.

(51) Int. Cl.
| | | |
|---|---|---|
| *G06Q 30/00* | (2012.01) | |
| *G06F 17/30* | (2006.01) | |
| *H04L 9/32* | (2006.01) | |

(52) U.S. Cl.
CPC ... *G06F 17/30887* (2013.01); *G06Q 30/0185* (2013.01); *H04L 9/3247* (2013.01); *H04L 2209/805* (2013.01)

(58) Field of Classification Search
CPC .......... G06F 21/6218; G06F 17/30887; H04L 63/123; H04L 9/3247; H04L 2209/80; G06Q 30/02; G06Q 30/0185
See application file for complete search history.

(56) References Cited

U.S. PATENT DOCUMENTS

| | | | | |
|---|---|---|---|---|
| 2007/0106897 A1* | 5/2007 | Kulakowski | ............ | G06F 21/35 713/171 |
| 2012/0214443 A1* | 8/2012 | Daigle | .................. | H04L 9/3228 455/411 |

(Continued)

FOREIGN PATENT DOCUMENTS

| | | |
|---|---|---|
| CA | 2760502 A1 | 11/2010 |
| EP | 1710764 A1 | 10/2006 |

OTHER PUBLICATIONS

Wen, A.; International Search Report from corresponding PCT Application No. PCT/CA2015/050720; search completed Sep. 2, 2015.

*Primary Examiner* — Sonji Johnson
(74) *Attorney, Agent, or Firm* — Brett J. Slaney; Blake, Cassels & Graydon LLP

(57) ABSTRACT

A method used to authenticate an item using an identification tag is provided. At the time of manufacture, the tags are created with various hardware attributes (HA), including a unique identifier (UID); and encoded with a signature of a message that includes a URL, and optionally a serial number associated with a product to which the tag is to be attached. The URL embeds various data such as one or more of the HAs, a serial number, etc., which can be used to verify the authenticity of the tag when verifying the signature. When a tag is read, the message including the URL is recovered and the signature is verified by the processor of the reader. This can be done to ensure that the URL in the message is one designated by the signer. The data in the signature can then be used to verify the authenticity of the tag and/or to detect tampering. The results of the verification can also be displayed to a user, e.g., using an available display on the electronic device including or otherwise acting as the tag reader.

21 Claims, 9 Drawing Sheets

(56) References Cited

U.S. PATENT DOCUMENTS

| | | | | |
|---|---|---|---|---|
| 2014/0012751 A1* | 1/2014 | Kuhn | ................... | G06Q 20/36 705/41 |
| 2015/0271179 A1* | 9/2015 | Wang | ..................... | H04L 63/10 726/30 |
| 2016/0021100 A1* | 1/2016 | Hoyer | ................. | H04W 12/06 726/10 |

* cited by examiner

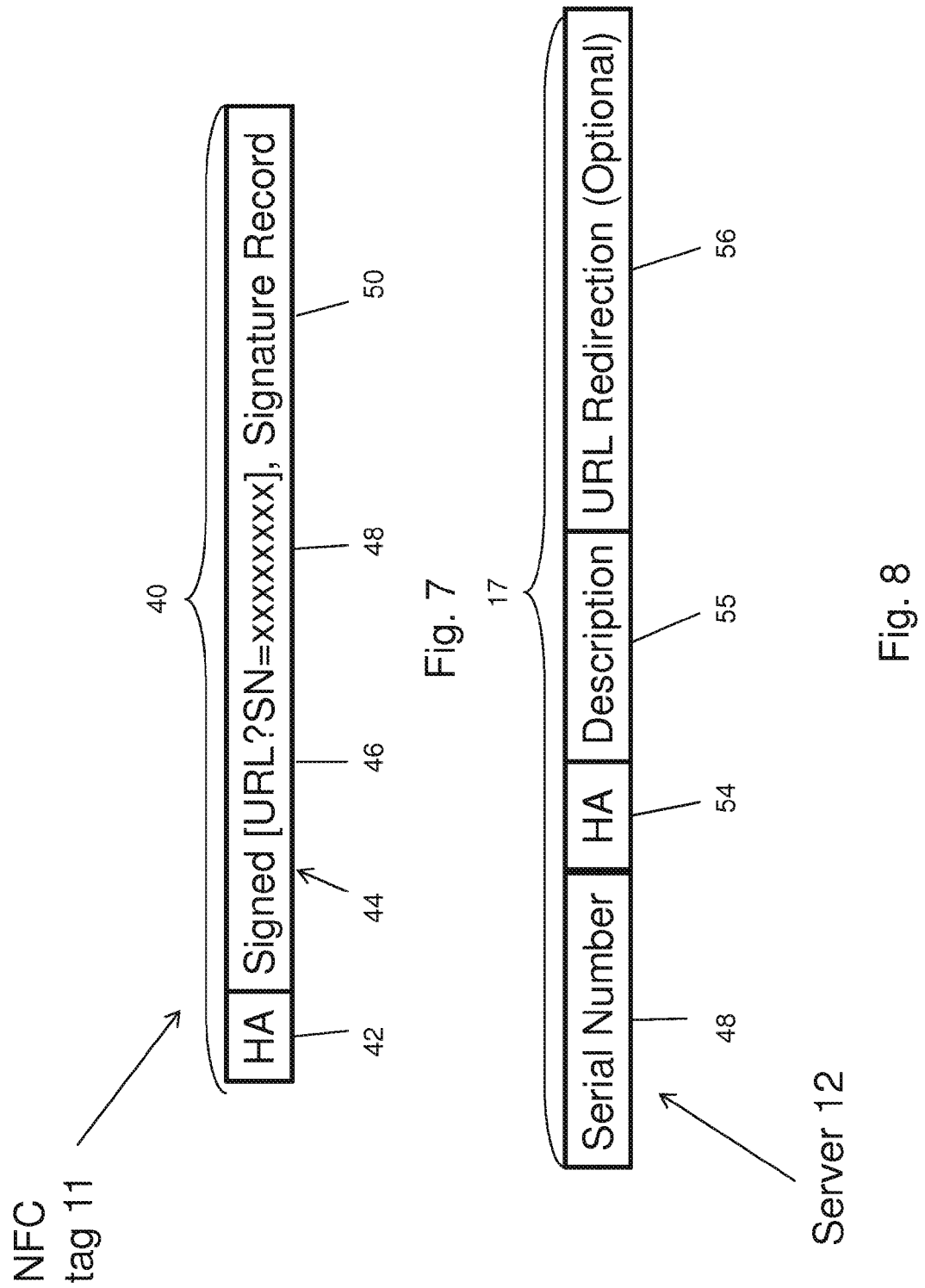

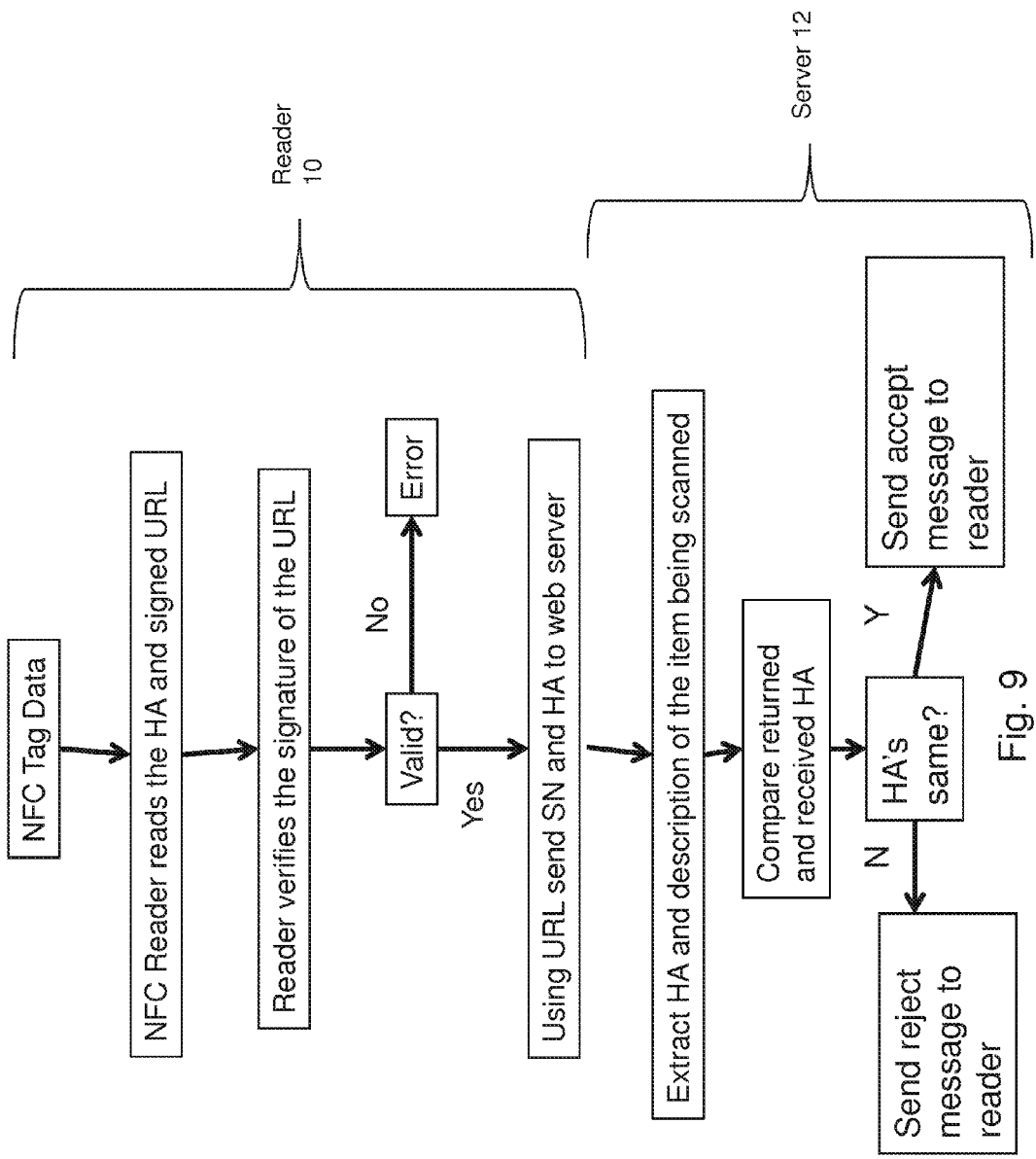

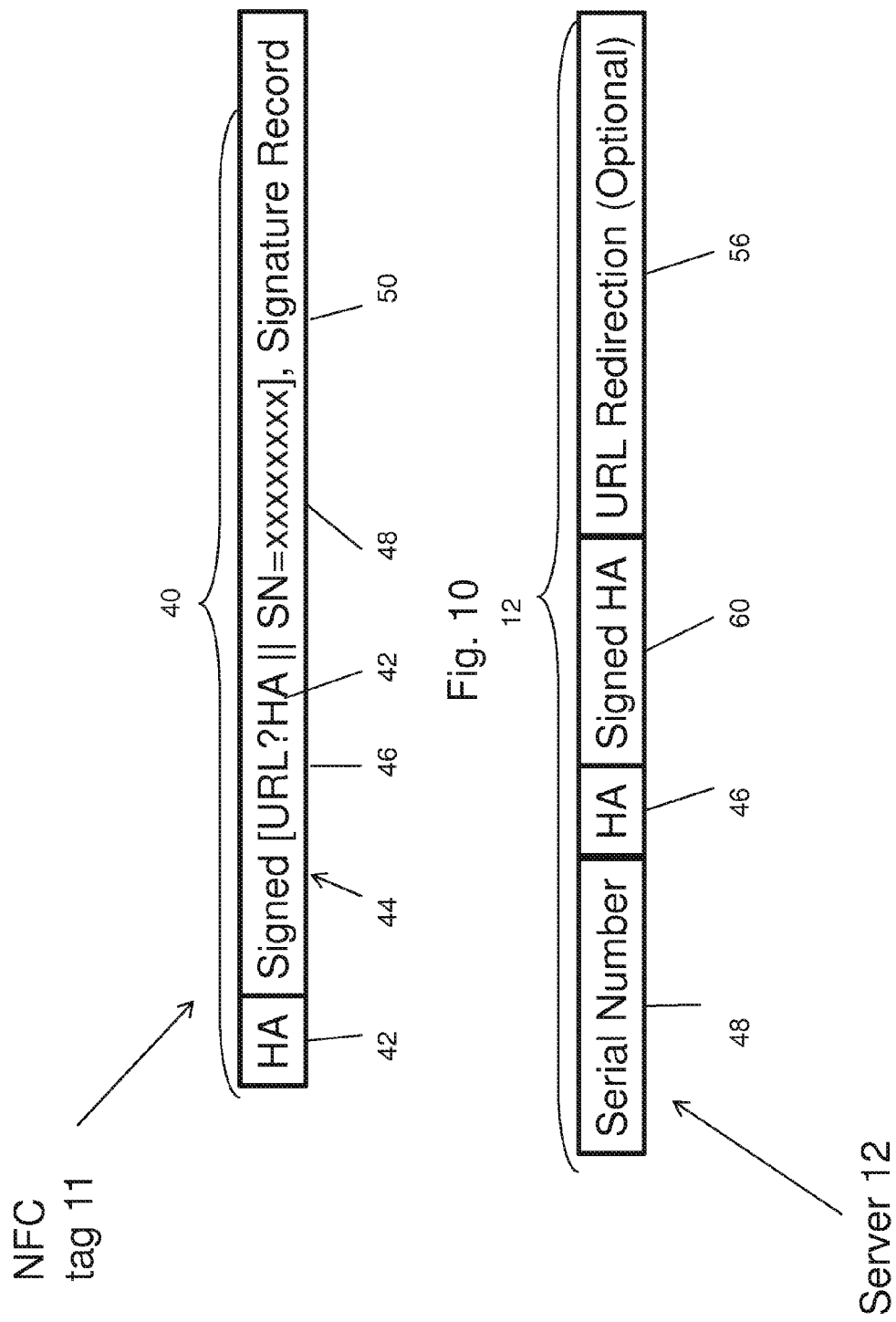

ID TAG AUTHENTICATION SYSTEM AND METHOD

This application claims priority to U.S. Provisional Application No. 62/034,397 filed on Aug. 7, 2014, and U.S. Provisional Application No. 62/164,148 filed on May 20, 2015, the entire contents of both applications being incorporated herein by reference.

FIELD OF THE INVENTION

The invention relates to item authentication using electronic wireless tags.

BACKGROUND OF THE INVENTION

The verification of the authenticity of an item is often done by labelling the item with a distinguishable piece of identification. Traditionally such identification is the label bearing the maker's name and product name, but the ability to reproduce such labels by counterfeiters has required more sophisticated solutions. Identification techniques currently used include engraving, holograms, two dimensional bar codes, referred to as QR codes, and identifiers using radio frequency, commonly referred to as RFID tags, and which include near field communication (NFC) tags as a subset of RFID tags. The RFID tags are not as easily copied and are more expensive to produce, and so act as a deterrent to the counterfeiter. The tags can be scanned to identify the manufacturer and indicate if an item is authentic or otherwise fraudulent. Although the tags are harder to copy, tags may be substituted from one product of the manufacturer to another and for high value goods the cost of manufacturing the tags is offset by the large profit available.

RFID tag readers and RFID tags function through the use of electromagnetic modulation. To read an NFC tag, the NFC reader emits an electromagnetic field with specific properties to interact with the tag. The tag becomes powered by the reader itself after interaction has occurred allowing the tag to modulate the electromagnetic field. The modulated field is then read and analysed by the reader and the information transferred from the tag to the reader, thus allowing for the data to be processed.

Reading identification tags often requires specialized hardware. The hardware is typically considered expensive to purchase and maintain. The readers may also require direct line of sight of the tag itself to read the data that is contained in/on it. In particular RFID card readers are expensive and are highly specialized to the task of reading identification cards.

The process of fabricating products may be performed under strictly controlled environments and access to the tags themselves restricted within the manufacturing environment. Such a controlled environment ensures that the opportunity to tamper with a product before deployment is reduced.

However, the volume of identification tags that are required in a large manufacturing concern creates a problem in maintaining control of the issued tags. Large quantities of identification tags can become lost in sizeable manufacturing operations, or may be discarded with items rejected for quality control purposes. The integrity of the tags are at risk, since if genuine tags become lost they can be applied to fraudulent items and still be scanned to indicate that they are genuine.

Increased security can be obtained by using a more sophisticated identification method. The increase in complexity of the tag increases the cost per tag. RFID tags with active cryptographic functionality are powered and are typically more expensive than their passive unpowered counterparts, such as NFC tags. Powered RFID tags contain a security chip as well as challenge and response based cryptographic functions.

Where cryptographic functionality is available, data can be digitally signed to increase the reliability of the underlying data. Signatures are used to check the authenticity of data that has been signed. If a signature is not recognized during the verification stage an error will normally occur. Signatures can be applied to various types of data strings. However, the verification of the signature only indicates that the tag has been signed by the manufacturer or producer and does not indicate the origins of the product to which the tag is applied.

It is therefore an object of the present invention to obviate or mitigate the above disadvantages.

SUMMARY OF THE INVENTION

In one aspect, there is provided a method of verifying a signature on a tag, the method comprising: reading, using a tag reader, at least one value identifying an attribute of the tag; verifying a signature stored in memory on the tag, the signature having been generated by signing a uniform resource locator (URL), the URL embedding the at least one value identifying an attribute of the tag; and comparing the at least one values to verify the tag.

In another aspect, there is provided a method of signing a tag, the method comprising: embedding at least one value identifying an attribute of the tag into a uniform resource locator (URL); signing the URL to generate a signature; and storing the signature in memory of the tag.

In yet another aspect, there is provided a method of remotely verifying a signature on a tag, the method comprising: receiving a verification query from a tag reader, the verification query comprising at least one of a signature to be verified, and at least one value identifying an attribute of the tag, the signature having been generated by signing a URL, the URL embedding the at least one value identifying the attribute of the tag; using the contents of the verification query and information in a database to verify the tag; and sending a verification response to the tag reader.

BRIEF DESCRIPTION OF THE DRAWINGS

Embodiments will now be described by way of example, with reference to the accompanying drawings in which:

FIG. 7 is a representation of data strings in the NFC tag and web server of FIG. 1;

FIG. 8 is a representation of a table entry corresponding to a URL associated with the NFC tag;

FIG. 9 is a flow diagram, similar to FIG. 4 showing an alternative embodiment of verification using the system of FIG. 1;

FIG. 10 is a representation of the data string used in the embodiment of FIG. 7; and FIG. 11 is a representation of an alternative data string.

DETAILED DESCRIPTION OF THE INVENTION

In general terms the following describes a method used to authenticate an item using an identification tag. At the time of manufacture, the tags are created with various hardware attributes (HA), including a unique identifier (UID); and encoded with a signature of a message that includes a URL, and optionally a serial number associated with a product to which the tag is to be attached. The URL embeds various data such as one or more of the HAs, a serial number, etc., which can be used to verify the authenticity of the tag when verifying the signature. When a tag is read, the message including the URL is recovered and the signature is verified by the processor of the reader. This can be done to ensure that the URL in the message is one designated by the signer. The data in the signature can then be used to verify the authenticity of the tag and/or to detect tampering. For example, if the signature is successfully verified, but the data in the signature does not match that on the tag, the tag can be considered a cloned tag and steps taken accordingly. The results of the verification can also be displayed to a user, e.g., using an available display on the electronic device including or otherwise acting as the tag reader.

In some implementations, after the signature has been verified, the URL can be used to redirect the tag reader device to a particular web site via a web server. The web server can, at the same time, track tag verifications and provide a consistent redirect web address for various customers such as companies selling the products to which the tags are attached. The URL can also be used to send an HTTP query to a web server along with the serial number (SN). The web server checks the SN in a pre-established table or database of items and obtains the correct HA(s) (e.g., UID) and a description of the item. The HA obtained is compared with the HA associated with the tag, in turn associated with the item. The authenticity of the item may then be confirmed when the UIDs are the same. Optionally, further confirmation may be provided from the description of the product and with the actual product. Preferably, the tags are NFC tags that are integrated into a product at the time of manufacture to ensure they are affixed in a secure environment. This reduces the chance that tags can be used to falsely identify a fraudulent item.

NFC tag readers in the form of mobile electronic devices such as smart phones may be used to read the information contained in the tags. The use of smartphones eliminates the need for specialized tag readers. It also enables anyone with a smartphone that is NFC enabled to be able to confirm the authenticity of an item.

Figure 1:
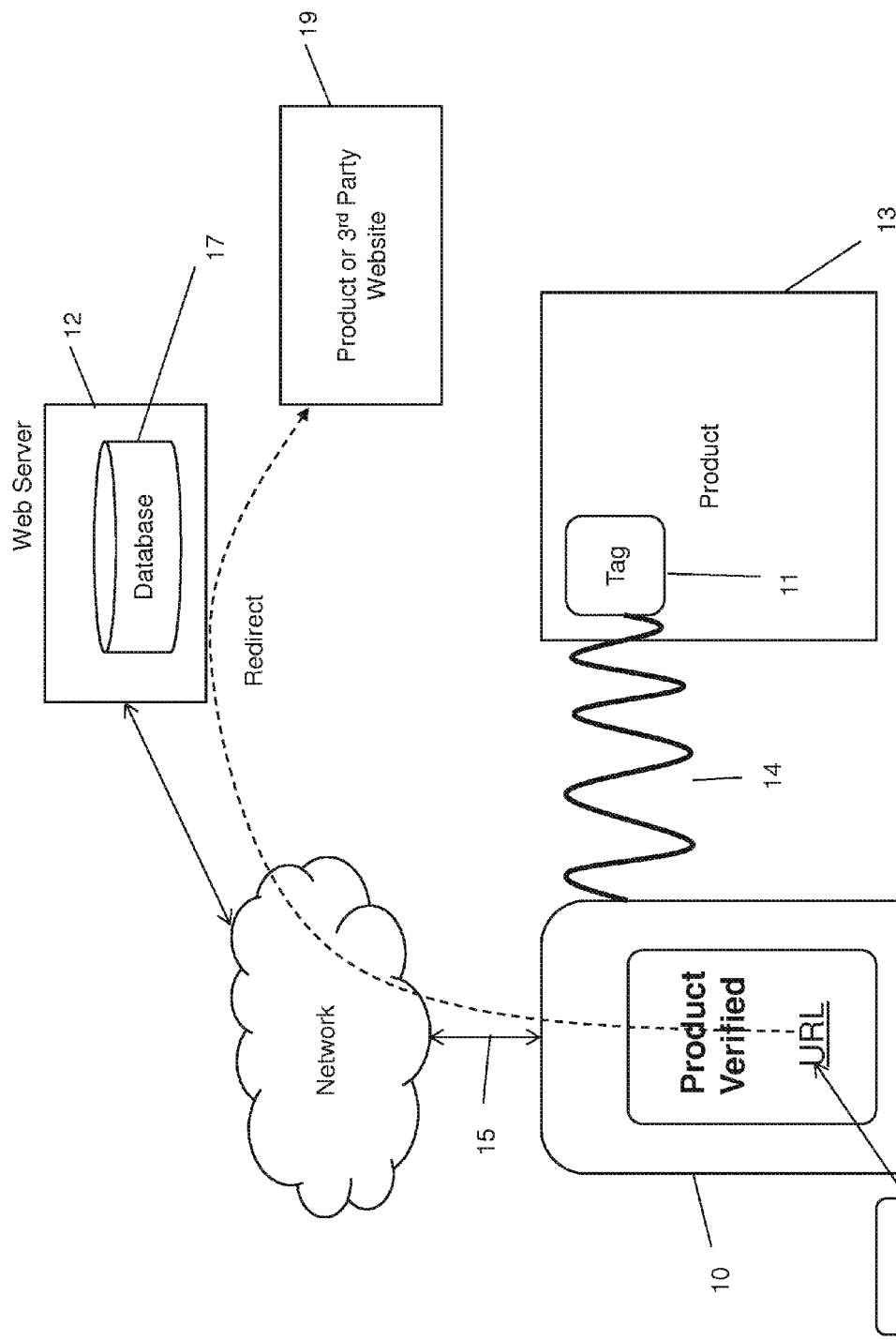
FIG. 1 shows the components of a system for authenticating tags.

Referring now to FIG. 1, an authentication system has three primary communicating components, namely an electronic device configured as or including a tag reader 10, a tag 11 and a web based server 12. In the present embodiment, the tag 11 is an NFC tag, although it will be appreciated other forms of RFID tags may be used, that is attached to an item 13 whose authenticity is to be confirmed. The NFC tag 11 is affixed to the item 13 during the manufacturing process as will be described in greater detail below.

The reader 10 may be implemented in a mobile electronic device, such as a smart-phone or other personal mobile communications device with a near field communication (NFC) enabled module, and is used to read the tag 11 and communicate with the web server 12. The reader 10 communicates with the NFC tag 11 to read the data stored on the tag 11. As described herein, the NFC tag reader 10 is advantageously a mobile electronic device such as a smart-phone. This enables the reader to be implemented into an already existing product that is already in the hands of consumers. This reduces or eliminates the cost of purchasing specialized NFC tag readers. It will be appreciated that other forms of readers may be used, such as dedicated point of sale (POS) devices or inventory control scanners.

Figure 2:
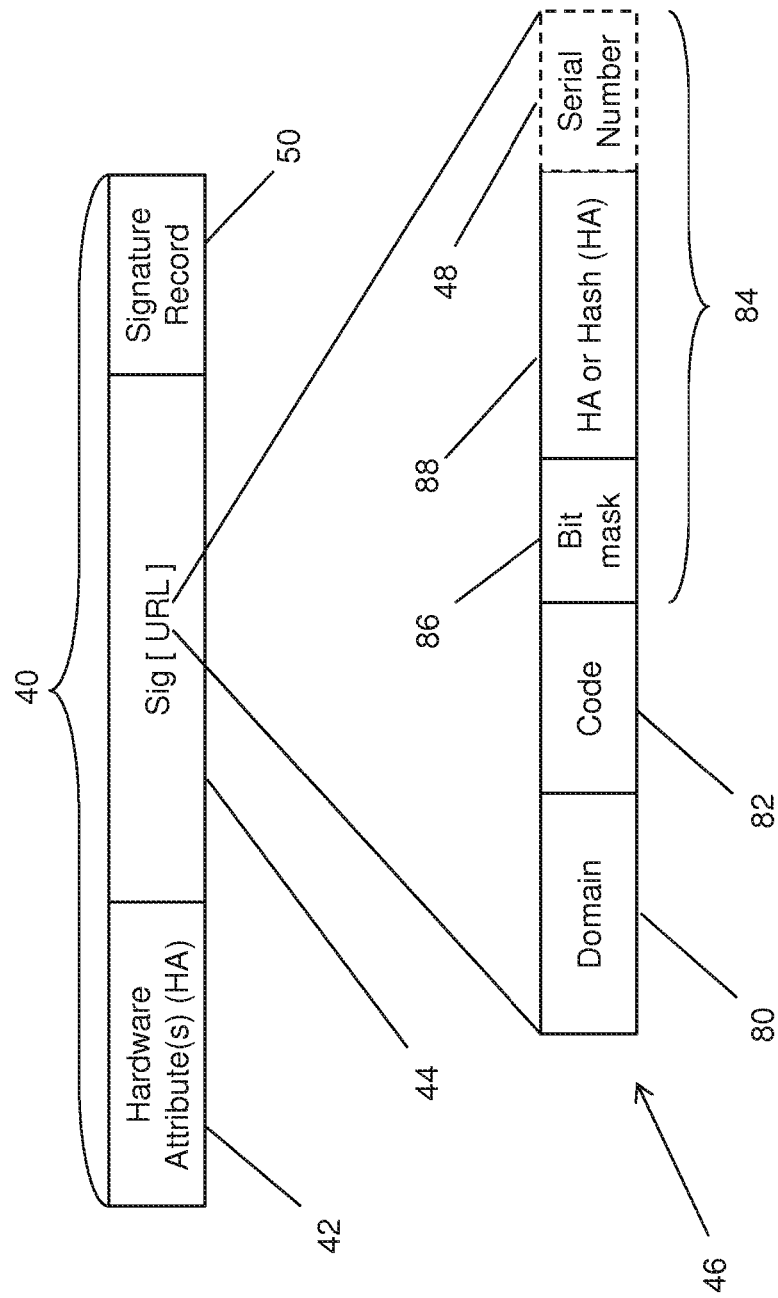
FIG. 2 is a representation of a data string in an NFC tag illustrating a representative uniform resource locator (URL) structure.

As seen in FIG. 2, each of the tags 11 has various hardware attributes (HAs) 42 such as a UID, NFC forum tag type, tag size, max NDEF message size, etc. For example, the tag 11 typically has a limited memory 40 in which is embedded at manufacture a secure UID, which can be a particularly good attribute to use in order to authenticate a tag 11 since the UID is by its nature meant to be unique. The UID is programmed at the time of manufacture and cannot be altered through subsequent manipulation. The other HAs would likewise be set at the time of manufacture. The memory 40 also includes a signature 44 on a message having a target URL 46.

The URL 46 includes a domain 80 (e.g. https://webserver.com), and in this example a code 82. The code 82 can be used to identify a particular entity associated with the products 13 to which the tag 11 is affixed, e.g., the manufacturer. The URL 46 would in such an example direct the tag reader 10 to an area within the domain 80 associated with the web server 12. The URL 46 also embeds verification data 84, which can be used by the tag reader 10 to verify the tag 11 at the tag reader 10, to perform additional checks using web queries, etc. In this example, the verification data 84 includes a bit mask 86 for identifying what is included within a hash 88 of the HA 42. It can be appreciated that the HA 42 can also be included in plaintext and thus a bit mask 86 would be optional.

The following table illustrates an example set of bitmask values:

| | |
|---|---|
| 0001 | UID |
| 0010 | NFC Forum Tag Type (Type 1, 2, 3, or 4) |
| 0100 | Tag Size (in bytes) |
| 1000 | Max NDEF Message Size (in bytes) |

Example Bitmask Values

Assuming the bitmask values in the above, a few example URLs 46 are now provided. In a first example, only a UID is embedded in the URL 46, and the UID is not hashed and therefore does not include the bitmask 86:

https://trst.ca/abcdef?u=<UID>. The "trst.ca" value corresponds to the domain 80, the "abcdef" value corresponds to the code 82, and the characters following the "?" form the embedded data 84. In this example, only a UID is embedded.

In a second example, the above URL 46 includes a hash of the UID, and thus a bitmask 86:

https://trst.ca/abcdef?b=1&d=<HashOfUID>. The "b=1&d" corresponds to the bitmask 86 and indicates that the following value is a hash of the UID.

In a third example, all four of the above HAs 42 are embedded, but are not hashed and no bitmask 86 is included:

https://trst.ca/abcdef?u=<UID>&t=<TagType>&s=<TagSize>&m=<MaxNDEFSize>.

The t=<TagType> identifies the tag type, the s=<TagSize> identifies the tag size, and the m=<MaxNDEFSize> identifies the message size.

In a fourth example, the URL 46 in the third example includes a hash of all four HAs 42 and thus includes a bit mask 86:

https://trst.ca/abcdef?b=f&d=<HashOfAllHardwareAttributes>.

In the configuration shown in FIG. 2, a product identifier serial number (SN) 48 related to the specific item 13 is also optionally embedded in the URL 46. As will be described more fully below, the serial number 48 is attributed to the tag 11 during the integration with the item 13 and duplicates the unique identification provided by the HA 42 (e.g. UID). The use of a separate serial number can also, however, avoid the need to read the HA 42 during integration and thereby simplifies the process in some implementations. The message containing the URL 46 is signed using a convenient signature protocol, such as an ECDSA signature protocol and a signature record 50, formatted according to the NFC Forum Signature RTD 2.0 specifications, is appended to the signature and stored in the memory 40. The signature 44 is performed by the author of the tag 11 using the author's private key and the corresponding public key is included in the signature record 50, preferably as a certificate of a trusted certificate authority whose public key is distributed within the system.

Referring again to FIG. 1, it can be seen that the tag reader 10 is also enabled to communicate with the web-based server 12. The server 12 includes a database 17 that contains a table providing a correlation between the UID of a tag 11 and the serial number of the item to which the tag is appended and a description of the item. Locations within the database 17 are accessed using a specific URL 46 for each location so it may be queried by the reader 10.

Two wireless communication protocols that may be used during the verification process are indicated at 14 and 15. Communication protocol 14 between the tag 11 and reader 10 is conveniently performed using RFID technology, in particular NFC technology. The communication range has a theoretical maximum of about 20 cm and a practical range between about 2 cm and 4 cm between the tag reader and tag. The other wireless protocol 15 that is used to communicate with the web server 12 can be WLAN, GSM, HSDPA, LTE or any other wireless technology that provides internet access. As shown in FIG. 1, the tag reader may display a verification message and include a hyperlink or other selectable option that is associated with the URL 46. In this way, the URL 46 can be used to send a redirect to a product or other 3$^{rd}$ party website via the web server 12. For example, a shirt or hat having a tag 11 affixed thereto can be scanned by a consumer and upon successful verification the URL 46 can be used to redirect the consumer to the manufacturer's website.

In general terms, the authenticity of the item 13 is verified by using the reader 10 to extract information pertaining to the item 13 from the tag 11. The information is contained in a message stored on the tag 11 that is signed so its authenticity can be verified. Once the signature has been verified, the reader 10 can provide confirmation of verification as shown in FIG. 1 with an option to redirect the user via the web server 12, or can optionally use the recovered information to query the database 17 in the web server 12. In such a case, the web server 12 extracts information pertaining to the item 13. A comparison can be made between the item 13 and the information extracted from the database 17. The comparison may be performed by the reader 10, which requires the information to be sent to the reader, or may be performed by the web server 12 and a "pass/fail" message provided to the reader 10 either transparently to the user or using a visual feedback as shown in FIG. 1. Both alternatives are described in more detail below.

Figure 3:
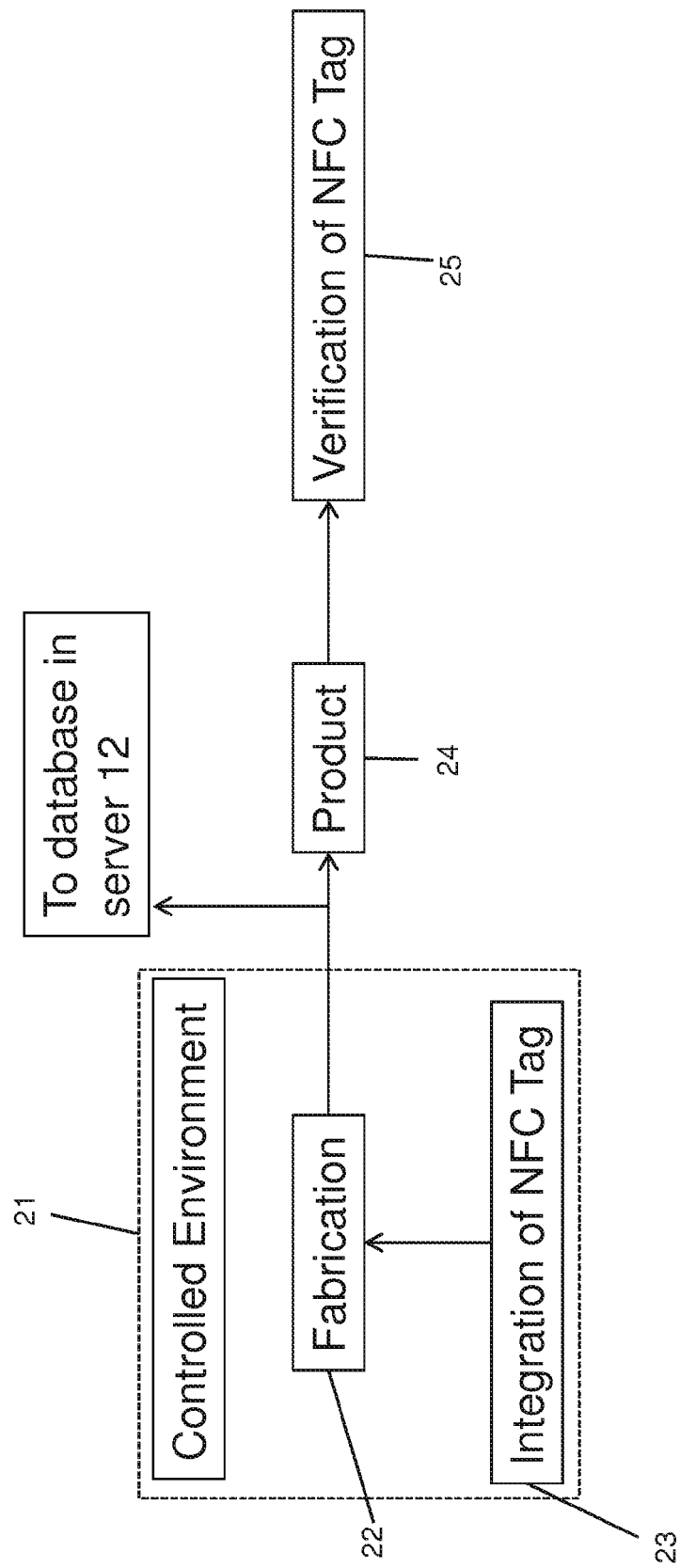
FIG. 3 shows the integration of a NFC tag into the manufacturing process.

The NFC tag 11 should preferably be affixed to or integrated into a product or item in a controlled environment 21. FIG. 3 shows how the NFC tag 11 is affixed to the desired item at the final fabrication stage 22 of product, preferably after quality control inspection. Each of the tags 23 has a UID embedded at manufacture of the tag 23, and will also have various other HAs 42. As indicated above, a serial number 48 can be added to the memory 40 during integration by embedding the SN 48 in the URL 46. The URL 46 with the embedded verification data 84 thus forms a message which is signed by the author of the tag. The signature is stored in the memory 40 in a manner that permits reading but not amendment, i.e. it is read only.

The integration 23 of the tags 11 at this stage reasonably ensures that the tags 11 are placed on genuine products and reduces the chance that tampering or other malicious activities can occur between production and delivery of a product 24. After manufacture of the product 24 has been completed, the NFC tag appended to the item 13 can then be read and the signature verified (25) by a NFC tag reader 10. Assuming the signature verifies, information including the serial number, UID, other HAs, and product description can be uploaded to the database 17 in the web server 12 in a secure manner and stored at a location corresponding to the URL 46.

Figure 4:
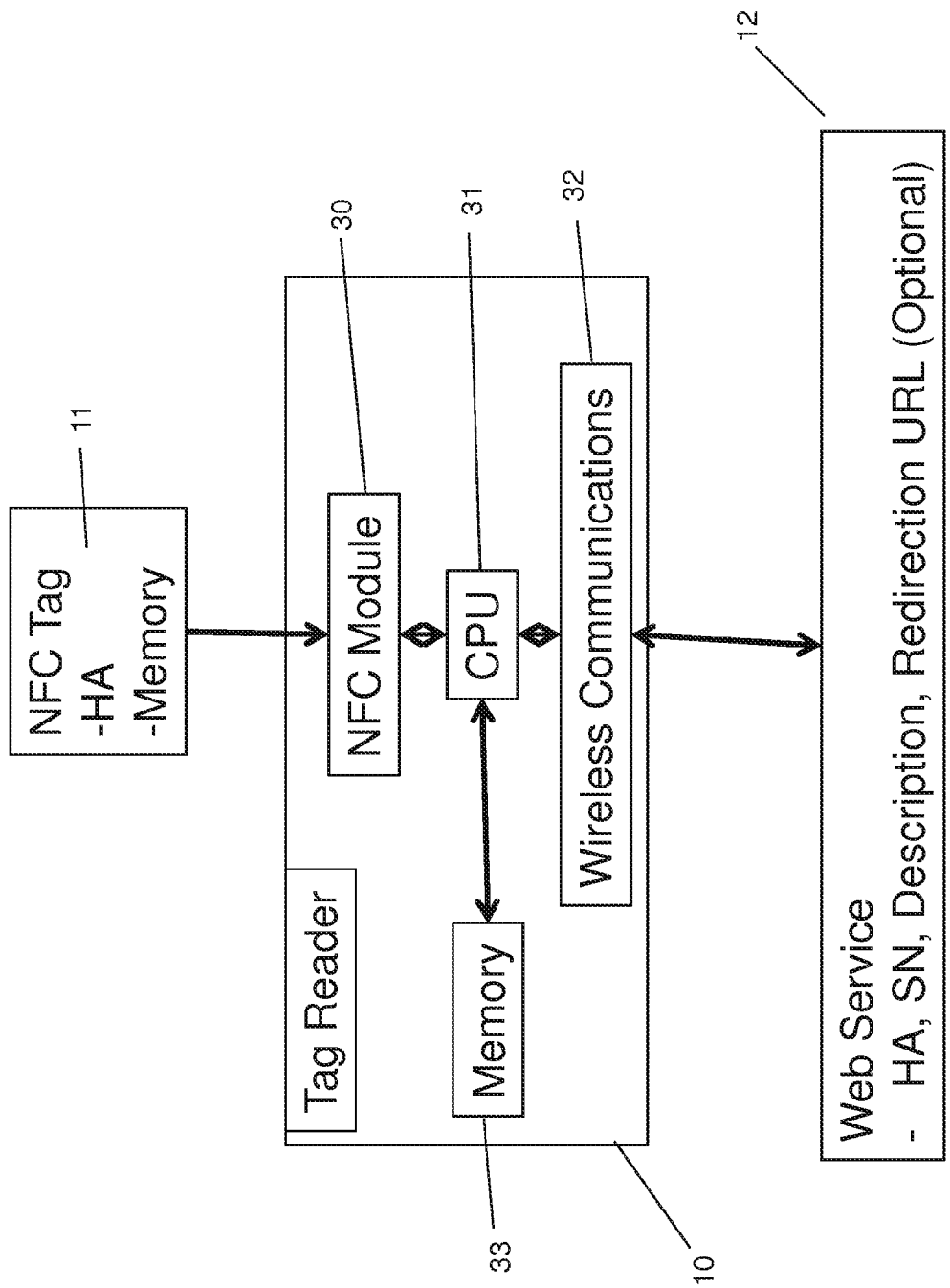
FIG. 4 is a detailed view of the components of the system shown in FIG. 1.

The NFC tag reader 10 shown in FIG. 4 may conveniently be provided in a smart phone for utilisation by consumers and uses a NFC module 30, a central processing unit 31 (CPU), a memory 33, and a wireless communications module 32. The CPU 31 is used in conjunction with the memory 33 to verify the signature received from the NFC module 30 when reading an NFC tag 11. The CPU 31 may then format a query and the wireless communications module 32 used to communicate the query to the server 12.

Figure 5:
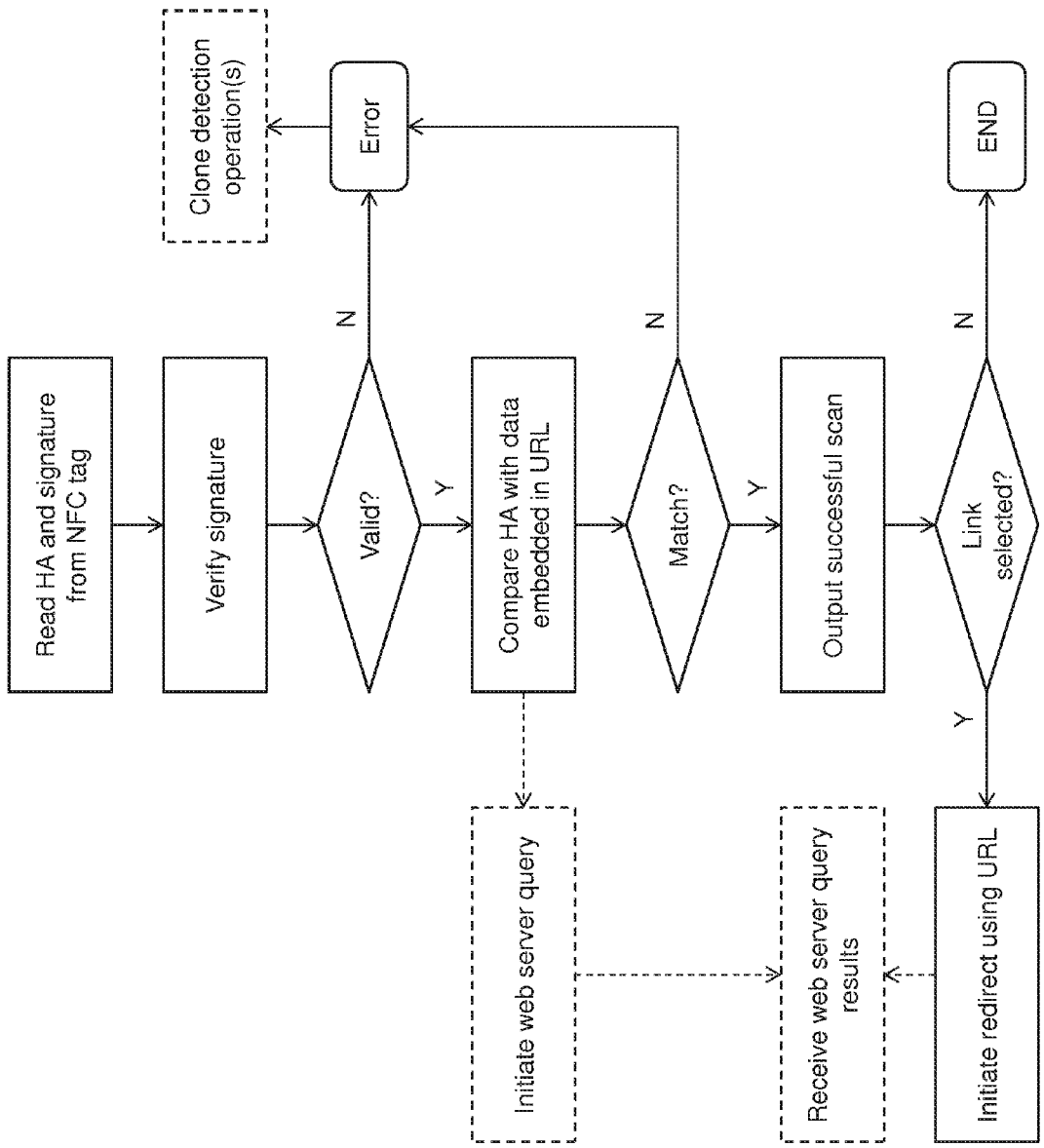
FIG. 5 is a flow diagram of reading an NFC tag to verify its authenticity.

FIG. 5 illustrates steps taken by the tag reader 10 to validate a tag 11 at the tag reader 10 and with an optional redirect link and optional web server query. The HA(s) 42 is/are read by the tag reader 10, along with the signature 44 that is saved in the tag's memory 40. The signature is then verified. If the verification is not successful, an error message or other alert or notification can be generated. If the verification is successful, the HA(s) 42 obtained from memory 40 are compared to the data embedded in the URL 46. For example, if the URL 46 indicates that only the UID is embedded, a UID read from the tag memory 40 is compared to the UID embedded in the URL 46. If there is no match, an error can be generated. In such cases, the error message can trigger one or more clone detection operations to be performed, since a successful signature verification but failed comparison of HAs 42 is a good indication that the signature of a legitimate tag 11 was copied to a grey market or otherwise illegitimate tag 11 to create a "clone". The clone detection operations can include gathering geo-location information for the reader 10 (e.g. using smart phone GPS capabilities) and sending clone-detection alerts to the web server 12 or other third party service or authority. Such information can be tracked to pinpoint cloning operations, distribution centres, retailers, etc. This information can also be provided to the manufacturer of the tags 11, e.g., to track potential cloning and grey market activity within their supply chain.

If there is a match, the tag reader 10 can output a successful scan, e.g., by displaying a message to the user as shown in FIG. 1. In this example, a link associated with the URL 46 can be displayed and it is determined if this is selected. If not, the process can end, e.g., if the message is closed or ignored. If the link is selected, a browser or app can be launched which provides access to a web site to which the user is redirected via the web server 12. At this time, the web server can record the successful verification and potentially obtain additional stats. The redirection is done through the web server 12 transparently to the user while allowing the manufacturer or other company (e.g. store) to have a secure and consistent landing point for such queries.

Optionally, as illustrated in dashed lines, the tag reader 10 can also send a query to the web server 12 using the serial number 48, HA 42, and/or other data to perform an additional check, to obtain additional information, etc. The results of the web query can also be displayed for the user. It can be appreciated that the operations shown in FIG. 5, minus those that query the web server 12, can be considered an "offline" mode, wherein the information available to the reader 10 is used to perform the verifications. Such an offline mode can be considered advantageous in situations where privacy is of a concern, since data is not sent into the cloud or other connected environment. To that end, the reader 10, particularly when embodied as a smart phone or other personal electronic device can include user options to control offline versus online modes. Similarly, automatic controls can be implemented, e.g. to only perform online queries in purported secure areas with offline mode being used in public or insecure environments.

Figure 6:
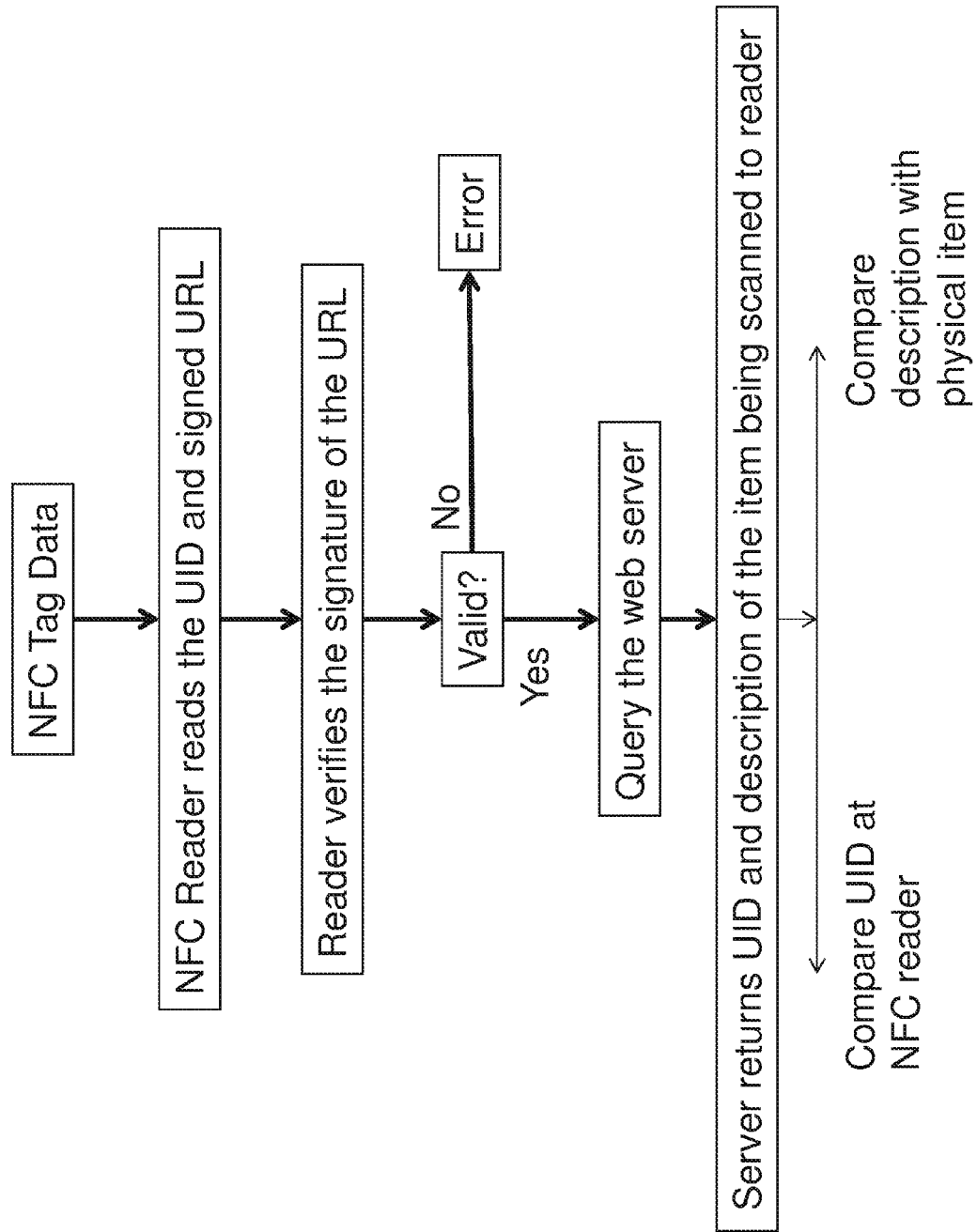
FIG. 6 is a flow diagram of reading an NFC tag to verify its authenticity, including a web query.

An example will now be provided in which the SN 48 is used to perform a web query. The steps required to validate an NFC tag 11 in this example are shown in FIG. 6. First the tag data in memory 40 (FIG. 7) is read by the tag reader 10. The data includes the HA 42 such as the UID and the signature 44. The CPU 31 verifies the signature 44 and extracts the message consisting of the URL 46 and serial number 48. If the signature is invalid, an error condition will occur and an indication that the article may not be authentic is provided on the reader 10. This is attained without communicating with the web server 12 and provides an initial threshold for authenticity. If it is determined that the signature is valid, a query will be formatted and sent to a web server 12.

Where the comparison is to be performed at the reader 10, the query will include at least the serial number 48 associated with the item 13 and is directed to the URL 46 contained in the message, and whose authenticity has been verified. The target URL 46 is directed to a location in the database 17 that, as illustrated in FIG. 8, correlates the serial number 48, the characteristics of the item 13, identified at 55, and the UID or other HA 42.

A query to the URL 46 will, therefore, extract the UID or other HA 42 and the product description 52 associated with the serial number 48 for comparison at the phone containing the tag reader 10. This information is sent to the tag reader 10, which may then compare the received HA 42 and that on the tag itself. If the HAs match, the tag is considered authentic. The reader 10 may also display the characteristics of the item, e.g. Rolex watch with gold case, or an image of the item so the user can make a visual comparison to confirm the authenticity. Clone detection operations can also be performed, as discussed above, when it is determined that the signature is valid but not the HA(s) 42.

By signing the URL 46 and the serial number 48, the reader 10 may be assured that a trusted party has attested to the correctness of the URL and a spoof has not been substituted in the tag 11 by a counterfeiter. Where additional information or functionality is required, an optional URL redirection 56 is provided in the database 17 to facilitate production and to allow information from the alternative site to be included and forwarded to the reader 10. The URL 46 can be programmed in batches during manufacture and the redirect URL 56 incorporated in the database 17 subsequently. The redirect URL 56 may also recover additional information. This may, for example be a list of additional features or a product comparison to competitor's devices. However, access to the optional URL does not compromise the initial direction to the target URL 46 that maintains the data-base on which the verification is based. The redirection URL 56 may also be used to provide access to additional functions that are associated with the item 13. For example, the item 13 may be a car and the redirect 56 accesses a service record of the car. In this case, the redirect 56 may include a password protected link to the service record to control access to that site.

In the above embodiment, the query to the database 12 returns the HA(s) 42 associated with the serial number 48 to the reader 10 and the CPU 31 in the reader 10 is used to compare the HAs 42. In an alternative arrangement shown in FIGS. 9 and 10, the comparison of HAs 42 is performed by the server 12 and a simple message provided to the reader 10 indicating the authenticity or otherwise of the item 13.

To further enhance the performance of the system, the data string in the tag 11 may be modified as shown in FIG. 10, although it will be appreciated that the data string may be as shown on FIG. 7. In the embodiment of FIG. 10, the HA 42 is included in the message that is signed and stored on the tag 11. In this way the verification of the signature will also verify the HA 42 before being sent to the server 12.

As illustrated in FIG. 9, the reader 10 reads the data in the memory 40 and verifies the signature 44. Assuming the signature is valid, the URL 46 is used to direct a query to the database 17. The query sent to the server 12 includes the HA 42 and serial number 48 read from the tag 11. The server 12 queries the database 17 using the URL 46 and serial number and extracts the HA 42 associated with the serial number. Rather than sending the extracted HA 42 to the reader, the server 12 compares the HA 42 received from the reader 10 and that recovered from the data base 17 and if they are identical, sends a message to the reader 10 that the item 13 is authenticated. If they are not identical, a message indicating lack of authenticity is sent.

As a further enhancement, also shown in FIG. 11, the data string may include a signature of the HA 42, indicated at 60, which is included in the query sent to the server 12. Upon receipt of the query, the server 12 verifies the signature 60, using the HA 42 sent as part of the query, to authenticate the HA 42 and completes the comparison with the HA recovered from database 17. Alternatively, the bandwidth may be reduced by sending only the signature 60 from the reader 10. The signature 60 is then verified using the HA 42 recovered from the database 17, and authenticity or otherwise assessed from the verification process.

The interaction between the reader 10 and the web 12 facilitates the analysis of potential fraudulent operations. When deployed on a large scale, a manufacture of the item 13 can monitor every time a tag is read, producing powerful analytics. The user may just want product info (or service info) relating to the item 13, which is obtained by reading the tag 11. However, the manufacture will learn consumer behavior from the queries received, and will have any fraudulent tags, that is those that fail to verify the HAs 42, brought to his attention. This permits the nature of the fraudulent activity to be determined, for example, if fraudulent does it attempt to use the same HA 42, or are fraudulent activities occurring at the same location. Even if someone went to the trouble of producing a clone tag 11 for an item 13, then that could also be detected by the analytics by identifying, for example, too much of one product, or in too many locations, or in the wrong location.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the tag reader 10, NFC module 30, web service 12, any component of or related to such entities, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of verifying a signature on a tag, the method comprising:
   reading, using a tag reader, at least one value identifying an attribute of the tag;
   verifying a static signature stored in memory on the tag prior to the reading, the signature having been generated by signing a URL, the URL embedding the at least one value identifying an attribute of the tag; and
   comparing the at least one values to verify the tag.

2. The method of claim 1, wherein the attribute of the tag corresponds to a hardware attribute determined or applied at a time of manufacture.

3. The method of claim 1, wherein the URL embeds a hash of the at least one value identifying an attribute of the tag.

4. The method of claim 3, wherein the URL embeds a bit mask indicating the contents of the hash.

5. The method of claim 4, wherein the URL embeds a plurality of values identifying a plurality of attributes of the tag.

6. The method of claim 1, wherein the URL embeds a serial number associated with a product to which the tag is affixed or is to be affixed.

7. The method of claim 1, further comprising sending a query to a web server after detecting selection of the URL.

8. The method of claim 7, wherein selection of the URL is detected via an interaction with the tag reader, the tag reader displaying the URL.

9. The method of claim 7, further comprising receiving additional information from the web server.

10. The method of claim 9, wherein the additional information comprises at least one of: a confirmation of tag validity, product information associated with a product to which the tag is affixed, and an error message.

11. The method of claim 1, wherein if the signature is verified but the at least one values do not match, an error condition is detected indicative of a cloned tag.

12. The method of claim 11, further comprising sending a clone detection message to a third party.

13. A method of signing a tag, the method comprising:
   embedding at least one value identifying an attribute of the tag into a uniform resource locator (URL);
   signing the URL to generate a static signature; and
   storing the static signature in memory of the tag prior to the tag being verified by a tag reader.

14. The method of claim 13, wherein the attribute of the tag corresponds to a hardware attribute determined or applied at a time of manufacture.

15. The method of claim 13, wherein the URL embeds a hash of the at least one value identifying an attribute of the tag.

16. The method of claim 15, wherein the URL embeds a bit mask indicating the contents of the hash.

17. The method of claim 16, wherein the URL embeds a plurality of values identifying a plurality of attributes of the tag.

18. The method of claim 13, wherein the URL embeds a serial number associated with a product to which the tag is affixed or is to be affixed.

19. A method of remotely verifying a signature on a tag, the method comprising:
   receiving a verification query from a tag reader, the verification query comprising at least one of a static signature to be verified, and at least one value identifying an attribute of the tag, the static signature being stored on the tag prior to the verification query and having been generated by signing a URL, the URL embedding the at least one value identifying the attribute of the tag;

using the contents of the verification query and information in a database to verify the tag; and sending a verification response to the tag reader.

20. The method of claim 19, wherein verifying the tag comprises verifying the signature and extracting the at least one value for comparison with the database.

21. The method of claim 19, wherein verifying the tag comprises comparing the at least one value provided in the verification query with the information in the database.

* * * * *